(12) United States Patent
Hirata

(10) Patent No.: US 11,169,748 B2
(45) Date of Patent: Nov. 9, 2021

(54) SYSTEM AND METHOD

(71) Applicant: CANON KABUSHIKI KAISHA, Tokyo (JP)

(72) Inventor: Kensuke Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/741,481

(22) Filed: Jan. 13, 2020

(65) Prior Publication Data
US 2020/0233615 A1 Jul. 23, 2020

(30) Foreign Application Priority Data
Jan. 18, 2019 (JP) .............................. JP2019-007008

(51) Int. Cl.
| | |
|---|---|
| *G06F 3/12* | (2006.01) |
| *G06N 20/00* | (2019.01) |
| *H04N 1/44* | (2006.01) |
| *G06F 21/31* | (2013.01) |

(52) U.S. Cl.
CPC .......... *G06F 3/1203* (2013.01); *G06F 3/1204* (2013.01); *G06F 3/1273* (2013.01); *G06F 3/1287* (2013.01); *G06F 21/31* (2013.01); *G06N 20/00* (2019.01); *H04N 1/4433* (2013.01)

(58) Field of Classification Search
CPC ...... G06F 3/1203; G06F 21/31; G06F 3/1204; G06F 3/1253; G06F 3/1287; G06F 3/1273; G06N 20/00; G06N 3/0454; G06N 7/005; G06N 20/20; G06N 5/003; G06N 20/10; H04N 1/4433

USPC ........................................................ 358/1.15
See application file for complete search history.

(56) References Cited

U.S. PATENT DOCUMENTS

| | | | | |
|---|---|---|---|---|
| 2007/0229904 A1* | 10/2007 | Mori | ...................... | G06F 40/103 358/1.18 |
| 2010/0253976 A1* | 10/2010 | Kasai | ..................... | G06F 3/1204 358/1.15 |
| 2013/0057918 A1* | 3/2013 | Ohta | ...................... | G06F 3/1205 358/1.15 |
| 2017/0322691 A1* | 11/2017 | Tokuchi | ............. | H04N 1/00307 |
| 2018/0074763 A1* | 3/2018 | Fukasawa | ............. | G06F 3/1212 |
| 2018/0115678 A1* | 4/2018 | Takahashi | .......... | H04N 1/00652 |

FOREIGN PATENT DOCUMENTS

JP        5702538 B2    4/2015

* cited by examiner

*Primary Examiner* — Miya J Williams
*Assistant Examiner* — Darryl V Dottin
(74) *Attorney, Agent, or Firm* — Canon U.S.A., Inc. IP Division

(57) ABSTRACT

An estimation unit provides an estimation result using a trained model generated by machine learning which is trained using training data that includes input data representing document data about documents read from a plurality of MFPs and teaching data representing collected setting data about each of the documents read from the plurality of MFPs. A setting unit transmits, for a particular document read by the MFP, an estimation request to the estimation apparatus along with document data about the document read by the MFP, and receives the estimation result, and sets an output setting of the document based on the received estimation result.

7 Claims, 14 Drawing Sheets

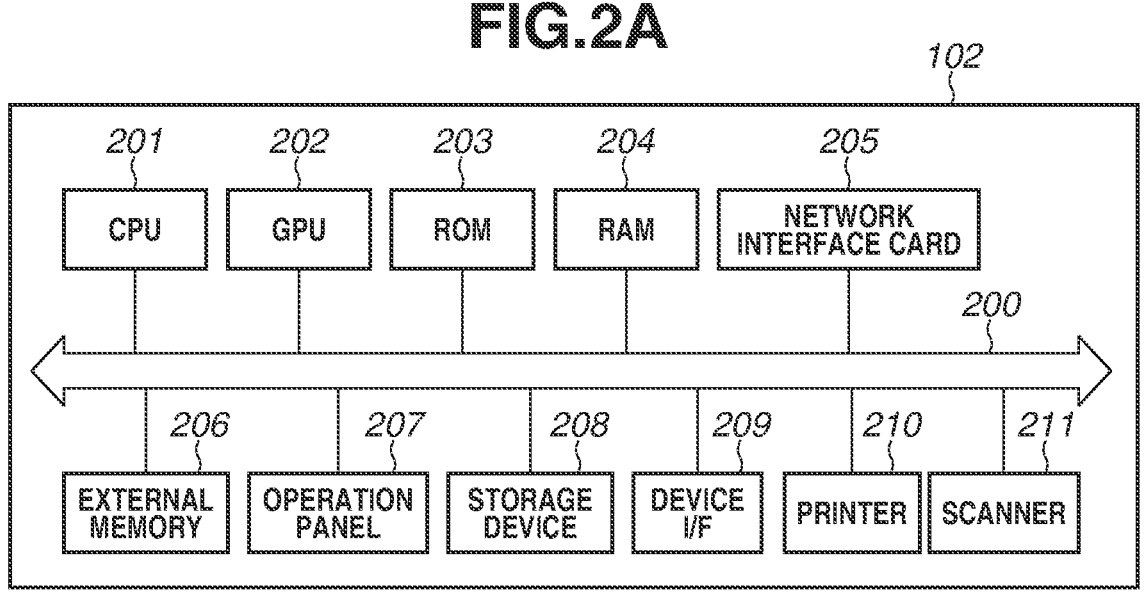
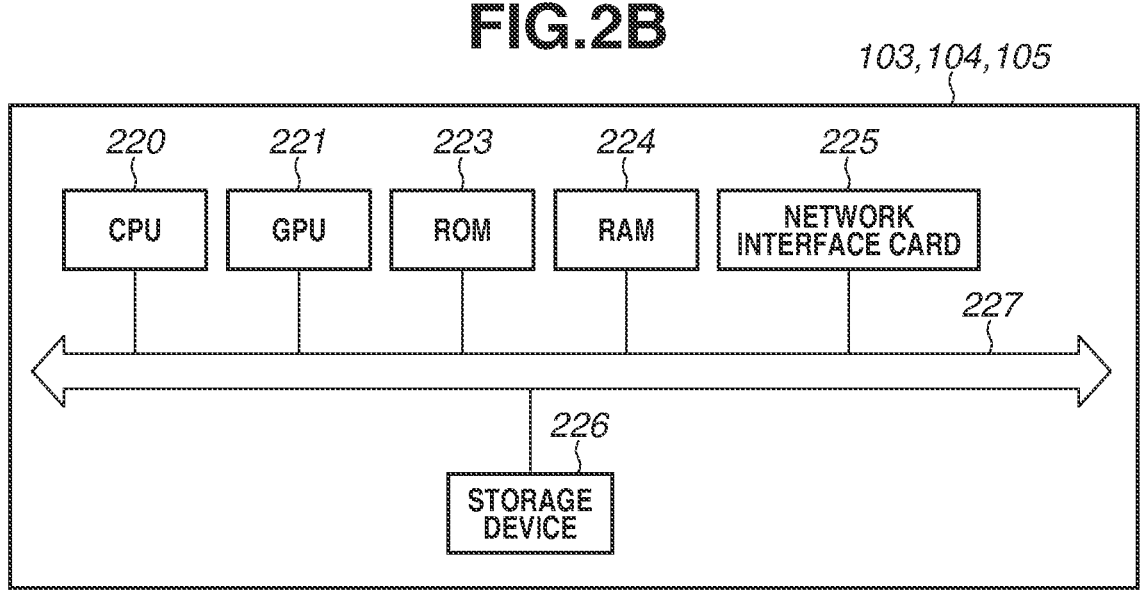

FIG.4

CLIENT INFORMATION 400

| CLIENT ID | PASSWORD | DEVICE ID | TENANT ID |
|---|---|---|---|
| Client0001 | ******** | Device0001 | tenant0001 |
| Client0002 | ******** | Device0002 | tenant0002 |
| Client0003 | ******** | | |
| Client0004 | ******** | | |

AUTHORIZATION TOKEN INFORMATION 410

| AUTHORIZATION TOKEN | EXPIRATION DATE | SCOPE | CLIENT ID |
|---|---|---|---|
| AT_000001 | 2016/12/31 15:02.01.196 | PutDeviceData | Client0001 |
| AT_000002 | 2017/1/1 09:32.11.034 | PutDeviceData | Client0002 |
| AT_000003 | 2017/1/1 15:02.02.120 | GetDeviceSetting | Client0001 |
| AT_000004 | 2017/1/2 02:24.53.659 | GetDeviceSetting | Client0002 |

FIG.5B

COLLECTED DATA INFORMATION 540

{"time":"2017-01-01T08:38:34.702Z", "eventid":"event0001", "tenantid":"tenant0002", "entity":"device", "eventName":"powerOn", "productName":"MFP_AAAA",...}
{"time":"2017-01-01T08:39:35.892Z", "eventid":"event0002", "tenantid":"tenant0001", "entity":"device", "eventName":"powerOn", "productName":"MFP_AAAA",...}
{"time":"2017-01-01T08:43:39.131Z", "eventid":"event0003", "tenantid":"tenant0002", "entity":"device", "eventName":"sleep",...}
{"time":"2017-01-01T08:45:25.653Z", "eventid":"event0004", "tenantid":"tenant0002", "entity":"device", "eventName":"powerOn", "productName":"MFP_BBBB",...}
{"time":"2017-01-01T10:03:53.052Z", "eventid":"event0005", "tenantid":"tenant0001", "entity":"userAction", "eventName":"login", "userId":"user1111",...}
{"time":"2017-01-01T10:05:21.563Z", "eventid":"event0006", "tenantid":"tenant0001", "entity":"job", "jobId":"job1111", "userid":"user1111", "jobType":"copy", "eventName":"jobStarted",...}
{"time":"2017-01-01T10:06:01.159Z", "eventid":"event0007", "tenantid":"tenant0001", "entity":"job", "jobId":"job1111", "userid":"user1111", "jobType":"copy", "eventName":"jobCompleted", "input.pageNumber":10, "printSettings.copies":1, "printSettings.layout":"2in1", "printSettings.paperside":"2Sided", "output.paperSize":"A4", "output.paperNumber":3,...}
{"time":"2017-01-01T10:06:20.561Z", "eventid":"event0008", "tenantid":"tenant0001", "entity":"userAction", "eventName":"logOut", "userid":"user1111",...}
{"time":"2017-01-01T10:11:07.160Z", "eventid":"event0009", "tenantid":"tenant0001", "entity":"device", "eventName":"sleep",...}
{"time":"2017-01-01T12:28:36.511Z", "eventid":"event0010", "tenantid":"tenant0001", "entity":"userAction", "eventName":"login", "userid":"user2222",...}
{"time":"2017-01-01T12:29:11.991Z", "eventid":"event0011", "tenantid":"tenant0001", "entity":"job", "jobId":"job2222", "userid":"user2222", "jobType":"copy", "eventName":"jobStarted",...}
{"time":"2017-01-01T12:30:25.516Z", "eventid":"event0012", "tenantid":"tenant0001", "entity":"job", "jobId":"job2222", "userid":"user2222", "jobType":"copy", "eventName":"jobCompleted", "input.pageNumber":1, "printSettings.copies":5, "printSettings.colorMode":"mono", "printSettings.layout":"1in1", "printSettings.paperside":"1Sided", "output.paperSize":"A4", "output.paperNumber":5,...}
{"time":"2017-01-01T12:30:58.981Z", "eventid":"event0013", "tenantid":"tenant0001", "entity":"job", "jobId":"job3333", "userid":"user2222", "jobType":"copy",...}
{"time":"2017-01-01T12:31:35.011Z", "eventid":"event0014", "tenantid":"tenant0001", "entity":"job", "jobId":"job3333", "userid":"user2222", "jobType":"copy", "eventName":"jobCompleted", "input.pageNumber":1, "printSettings.copies":5, "printSettings.colorMode":"mono", "printSettings.layout":"1in1", "printSettings.paperside":"1Sided", "output.paperSize":"A4", "output.paperNumber":5,...}
{"time":"2017-01-01T12:31:38.511Z", "eventid":"event0015", "tenantid":"tenant0001", "entity":"userAction", "eventName":"logOut", "userid":"user2222",...}
{"time":"2017-01-01T13:25:51.602Z", "eventid":"event0016", "tenantid":"tenant0001", "entity":"device", "eventName":"powerOff",...}
...

FIG.6

VECTORIZATION INFORMATION 600

601

| colorMode | |
|---|---|
| color | 0 |
| mono | 1 |

602

| layout | |
|---|---|
| 1in1 | (1,0,0,0,0) |
| 2in1 | (0,1,0,0,0) |
| 4in1 | (0,0,1,0,0) |
| 8in1 | (0,0,0,1,0) |
| 16in1 | (0,0,0,0,1) |

603

| paperside | |
|---|---|
| 1Sided | 0 |
| 2Sided | 1 |

604

| paperSize | |
|---|---|
| A0 | (1,0,0,0,0,...) |
| A1 | (0,1,0,0,0,...) |
| A2 | (0,0,1,0,0,...) |
| A3 | (0,0,0,1,0,...) |
| A4 | (0,0,0,0,1,...) |
| ... | ... |

TRAINED MODEL INFORMATION 610

| TENANT ID (611) | USER ID (612) | TRAINED MODEL FILE PATH (613) |
|---|---|---|
| * | * | /all_copies.model<br>/all_colorMode.model<br>/all_layout.model<br>/all_paperside.model<br>/all_paperSize.model |
| tenant0001 | * | /tenant0001_copies.model<br>/tenant0001_colorMode.model<br>/tenant0001_layout.model<br>/tenant0001_paperside.model<br>/tenant0001_paperSize.model |
| tenant0001 | user1111 | /tenant0001_user0001_copies.model<br>/tenant0001_user0001_colorMode.model<br>/tenant0001_user0001_layout.model<br>/tenant0001_user0001_paperside.model<br>/tenant0001_user0001_paperSize.model |
| tenant0001 | user2222 | /tenant0001_user0002_copies.model<br>/tenant0001_user0002_colorMode.model<br>/tenant0001_user0002_layout.model<br>/tenant0001_user0002_paperside.model<br>/tenant0001_user0002_paperSize.model |
| tenant0002 | * | /tenant0002_copies.model<br>/tenant0002_colorMode.model<br>/tenant0002_layout.model<br>/tenant0002_paperside.model<br>/tenant0002_paperSize.model |

FIG.7

CLIENT INFORMATION 700

| CLIENT ID | PASSWORD | DEVICE ID | TENANT ID |
|---|---|---|---|
| Client0001 | ******** | Device0001 | tenant0001 |

TRAINED MODEL INFORMATION 710

| TENANT ID | USER ID | TRAINED MODEL FILE PATH |
|---|---|---|
| * | * | /all_copies.model<br>/all_colorMode.model<br>/all_layout.model<br>/all_paperside.model<br>/all_paperSize.model |
| tenant0001 | * | /tenant0001_copies.model<br>/tenant0001_colorMode.model<br>/tenant0001_layout.model<br>/tenant0001_paperside.model<br>/tenant0001_paperSize.model |
| tenant0001 | user1111 | /tenant0001_user0001_copies.model<br>/tenant0001_user0001_colorMode.model<br>/tenant0001_user0001_layout.model<br>/tenant0001_user0001_paperside.model<br>/tenant0001_user0001_paperSize.model |
| tenant0001 | user2222 | /tenant0001_user0002_copies.model<br>/tenant0001_user0002_colorMode.model<br>/tenant0001_user0002_layout.model<br>/tenant0001_user0002_paperside.model<br>/tenant0001_user0002_paperSize.model |

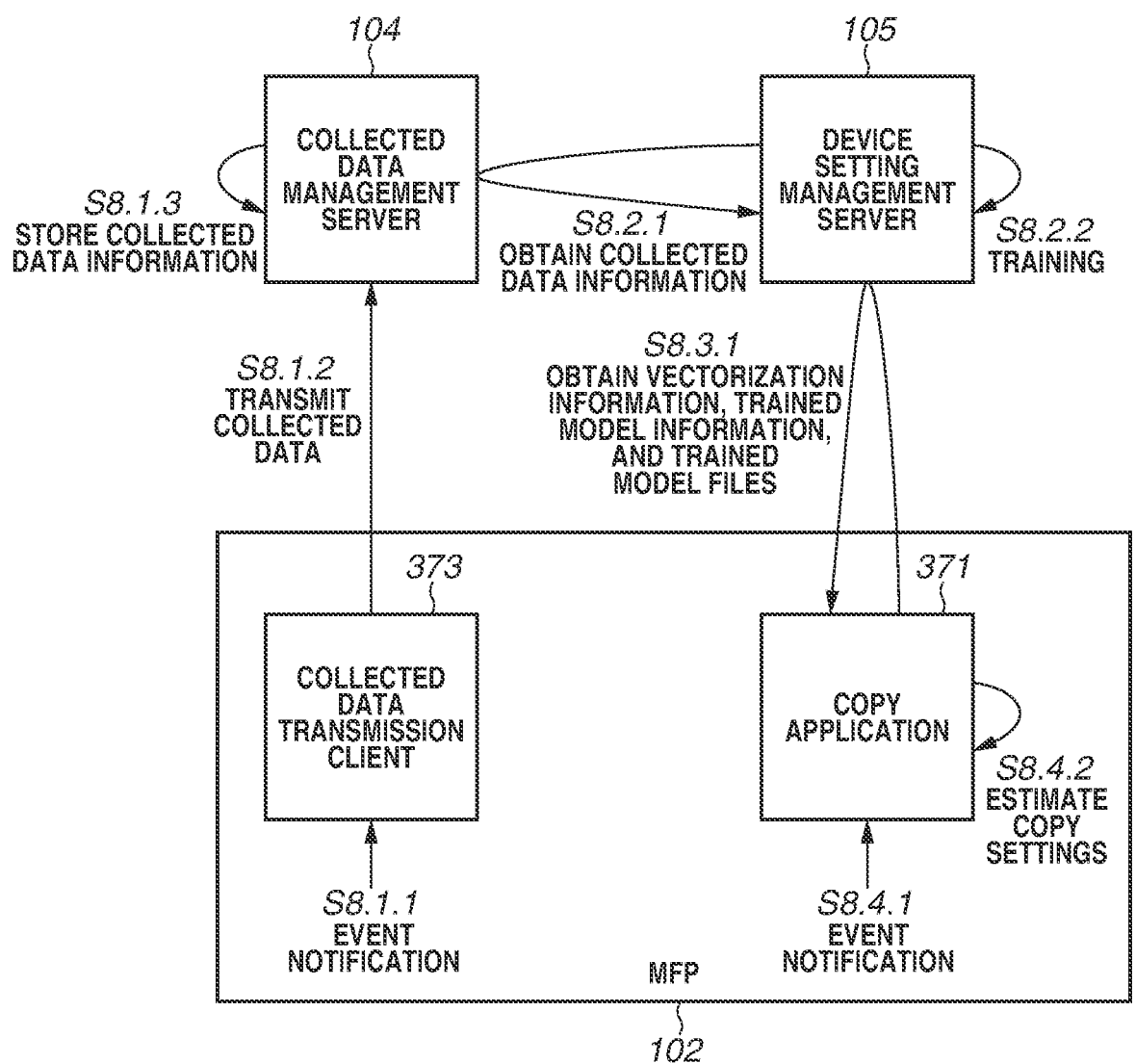

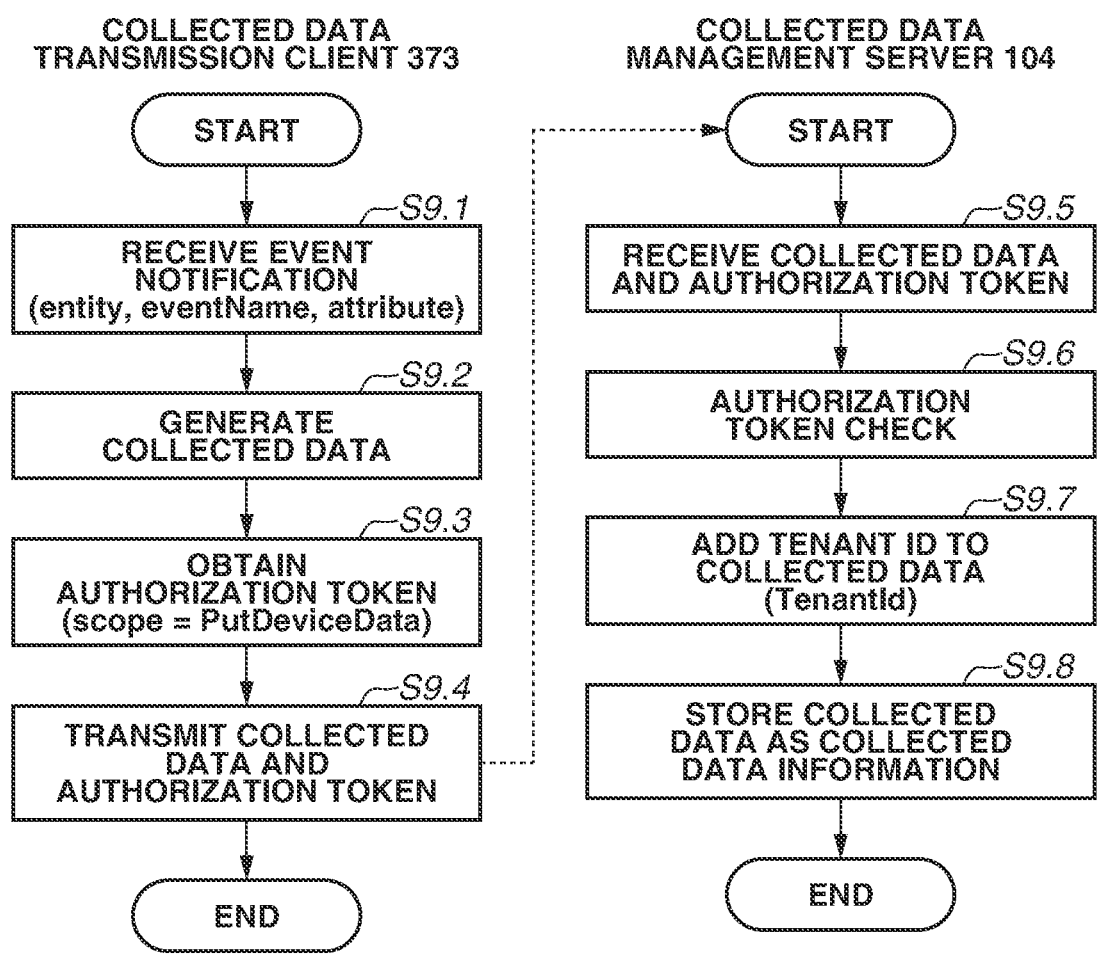

SYSTEM AND METHOD

BACKGROUND

Field

The present disclosure relates to a system, a method, and a program for performing learning and estimating a setting value based on data occurring in a device.

Description of the Related Art

Cloud computing where servers provide services for clients has recently been attracting attention. A major characteristic of cloud computing is that data conversion and data processing are executed in a distributed manner by using many computing resources, and requests from a large number of clients are processed in parallel by parallel distributed processing. There are more and more vendors who implement web services on a cloud computing environment for achieving cloud computing and provide a wide variety of services. In developing cloud services, utilization of many services already provided online offers advantages in terms of development speed and cost since efforts can be focused on development of products having new functions. More and more cloud services working in cooperation with multi function printers (MFPs) are now developed function by function, and applications on the MFPs are being configured to utilize various cloud services desirable for function implementation.

A factor behind the increased use of cloud services is high affinity with artificial intelligence (AI). Machine learning, which is one of the core techniques for constructing AI, can extract data features (such as properties, patterns, and trends) by analyzing a huge amount of data (called big data) using learning algorithms. Large amounts of computing resources for analyzing large amounts of data may be desirable for machine learning. For such a reason, the use of cloud services with immediately available computing resources is on the increase.

For example, the use of machine learning techniques has been paving the way to recommendation of other products based on users' purchase histories and estimation of persons and emotions from facial images. Business intelligence (BI) that enables past analysis, understanding of current situations, and future estimation by analyzing business activity data and supports managerial decision making has started to be widely used.

In the field of MFPs, collection and data analysis of log information occurring when users use MFPs have also been contemplated. Japanese Patent No. 5702538 discusses a technique for controlling the use of MFPs by users in a rule-based manner by collecting logs from a plurality of MFPs and conducting data analysis.

SUMMARY OF THE INVENTION

According to an aspect of the present disclosure, a system includes an estimation apparatus, and an MFP. The estimation apparatus includes a non-transitory computer-readable storage medium storing a program, and a data processing unit communicatively connected to the non-transitory computer-readable storage medium and configured at least by the program at least to function as an estimation unit configured to provide an estimation result using a trained model generated by machine learning which is trained using training data that includes input data representing document data about documents read from a plurality of MFPs and teaching data representing collected setting data about each of the documents read from the plurality of MFPs. The MFP includes a non-transitory computer-readable storage medium storing a program, and a data processing unit communicatively connected to the non-transitory computer-readable storage medium and configured at least by the program at least to function as a setting unit configured to transmit, for a particular document read by the MFP, an estimation request to the estimation apparatus along with document data about the document read by the MFP, and receive the estimation result, and set an output setting of the document based on the received estimation result.

Further features of the present disclosure will become apparent from the following description of exemplary embodiments with reference to the attached drawings.

BRIEF DESCRIPTION OF THE DRAWINGS

FIGS. 2A and 2B are hardware configuration diagrams of apparatuses.
FIG. 4 illustrates a structure of tables managed by an authorization server.
FIGS. 5A and 5B illustrate a data structure managed by a collected data management server and an example of data.
FIG. 6 illustrates a structure of tables managed by a device setting management server.
FIG. 7 illustrates a structure of tables managed by a multi function printer (MFP).
FIG. 8 illustrates data collection, training, and estimation procedures.
FIG. 9 illustrates the data collection procedure.

DESCRIPTION OF THE EMBODIMENTS

According to the conventional techniques, print setting values of setting items when a user uses a multi function printer (MFP), such as a color setting and a two-sided setting, are determined in a rule-based manner. However, there is an issue of complicated rule setting and management since devices such as an MFP have various setting items and there are a lot of use cases. In addition, logic for determining the setting items is suitably provided for an MFP in the form of a service.

In view of this, an exemplary embodiment of the present disclosure provides a mechanism for learning and estimating suitable print setting values used in a plurality of devices such as MFPs.

Figure 1:
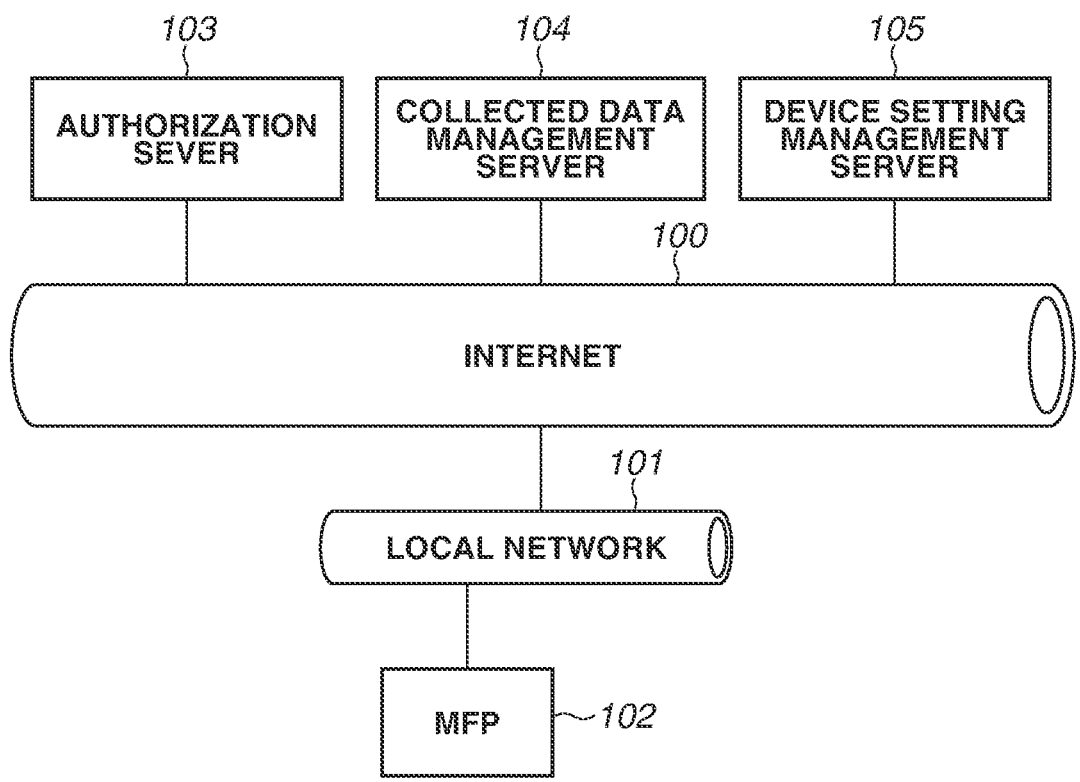
FIG. 1 is a system configuration diagram.

Exemplary embodiments of the present disclosure will be described below with reference to the drawings.
<System Configuration>
FIG. 1 is a diagram illustrating an overall configuration of a setting estimation system according to a first exemplary embodiment of the present disclosure. In FIG. 1, an MFP 102 can access the Internet 100 via a local network 101 and access servers 103 to 105. An authorization server 103 is a server for implementing Open Authentication (OAuth). The authorization server 103 manages client information, and issues and manages authorization tokens.

A collected data management server 104 and a device setting management server 105 belong to a security domain of the authorization server 103. To transmit a request to the collected data management server 104 and the device setting management server 105, an authorization token issued by the authorization server 103 is needed. The collected data management server 104 and the device setting management server 105 process the request only if the authorization token is validated. The validation check of the authorization token includes expiration date check and license check.

The collected data management server 104 is a server for managing data transmitted from the MFP 102. The MFP 102 generates data on events occurring in the MFP 102 and transmits the data to the collected data management server 104. The collected data management server 104 receives data from a plurality of MFPs 102 and stores the received data. The data that is transmitted from the MFPs 102 and stored will be referred to as collected data.

The device setting management server 105 is a server for managing settings used in the MFP 102. In the present exemplary embodiment, the settings of a copy function of the MFP 102 are analyzed and learned based on the collected data stored in the collected data management server 104. The MFP 102 estimates and displays on a screen the settings of the copy function based on the result of the learning by the device setting management server 105.

The servers 103 to 105 are published on the Internet 100 as cloud services each made redundant by a plurality of servers. For the sake of simple description, in the present exemplary embodiment, the servers 103 to 105 are configured as a single server each. While only one MFP 102 is illustrated, there is a plurality of connected MFPs.

<Hardware Configuration of MFP 102>

FIG. 2A is a hardware configuration diagram of the MFP 102. The hardware components are connected to a system bus 200. A central processing unit (CPU) 201 controls the entire MFP 102. The CPU 201 controls access to/from various devices connected to the system bus 200 in a centralized manner. The control is performed based on a control program stored in a read-only memory (ROM) 203, or a control program and resource data (resource information) stored in an external memory 206 connected via a disk controller. A graphics processing unit (GPU) 202 is an arithmetic unit specialized for image processing and vector operations such as machine learning. The ROM 203 is a storage unit and stores programs and various types of data inside. Examples of the programs include a basic input/output (I/O) program. Examples of the data include font data and template data used in document processing.

A random access memory (RAM) 204 functions as a main memory and work area of the CPU 201 and the GPU 202. The memory capacity of the RAM 204 can be extended by an optional RAM connected to a not-illustrated extension port. The MFP 102 exchanges data with external apparatuses via a network interface card (NIC) 205. An operation panel (operation unit) 207 displays a screen and accepts the user's operation instructions via the screen. The operation panel 207 also includes buttons and a display unit, such as a liquid crystal panel, for setting an operation mode of the MFP 102, displaying an operation status of the MFP 102, and making a copy specification operation. An external storage unit (storage device) 208 functions as a large-capacity memory and stores a program according to the present exemplary embodiment.

A device interface (I/F) 209 is a connection I/F for Universal Serial Bus (USB)-connectable external devices. A printer 210 uses conventional printing techniques. Examples of suitable implementation systems include electrophotographic (laser beam) printing, inkjet printing, and sublimation (thermal transfer) printing. The printer 210 prints image data converted from print data (in a page description language (PDL) or Portable Document Format (PDF) language) on a sheet. A scanner 211 uses conventional image reading techniques. The scanner 211 optically scans a paper document placed on a transparent platen and converts the scanned document into an image. The scanner 211 also reads a plurality of paper documents placed on an automatic document feeder (ADF) in succession and converts the read documents into images.

<Hardware Configuration of Server>

FIG. 2B is a diagram illustrating an example of a hardware configuration of each of the servers 103 to 105. The present exemplary embodiment is applicable to both a single apparatus and a system including a plurality of apparatuses as long as the functions of the present exemplary embodiment can be performed, unless otherwise specified. The present exemplary embodiment is also applicable to a system where connections are established and processing is performed via a network such as a local area network (LAN) and a wide area network (WAN) as long as the functions of the present exemplary embodiment can be performed, unless otherwise specified. In the present exemplary embodiment, the components will be described to be connected by a system bus 227.

A CPU 220 is a control unit of the server 103, 104, or 105. The CPU 220 executes application programs and an operating system of the server 103, 104, or 105, stored in a ROM 223 or a storage device 226. In addition, the CPU 220 controls temporary storage of information and files desirable for program execution in the RAM 224. A GPU 221 is an arithmetic unit specialized for image processing and vector operations such as machine learning. The ROM 223 is a storage unit and stores programs and various types of data inside. Examples of the programs include a basic I/O program. Examples of the data include font data and template data used in document processing.

A RAM 224 is a temporary storage unit and functions as a main memory and work area of the CPU 220 and the GPU 221. The server 103, 104, or 105 exchanges data with external apparatuses via a NIC 225. The storage device 226 is one of external storage units and functions as a large-capacity memory. The storage device 226 stores programs according to the present exemplary embodiment, including the application programs and the operating system (OS).

<Software Configuration of Authorization Server 103>

Figure 3A:
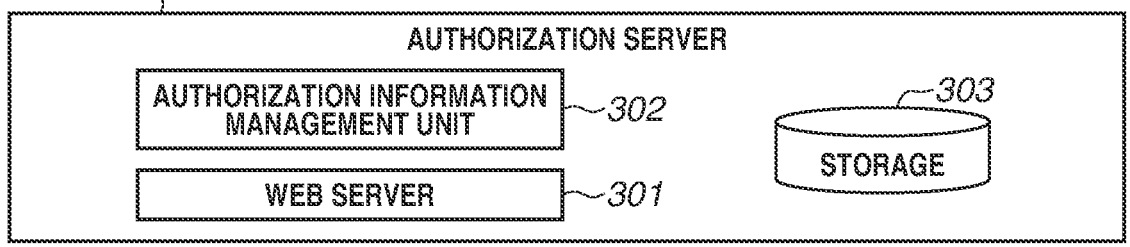
FIGS. 3A, 3B, 3C, and 3D are software configuration diagrams.

FIG. 3A is a software configuration diagram of the authorization server 103. Each software module is stored in the ROM 223 or the storage device 226 illustrated in FIG. 2B, and loaded into the RAM 222 by the CPU 220 and executed by the CPU 220 or the GPU 221 as described above.

A web server 301 provides various interfaces of the authorization server 103, and validates request information. An authorization information management unit 302 manages client information 400 and authorization token information 410 to be described with reference to FIG. 4, and issues an authorization token, checks a scope, and checks expiration date based on requests accepted by the web server 301. A storage 303 stores information retained by the authorization server 103.

<Software Configuration of Collected Data Management Server 104>

Figure 3B:
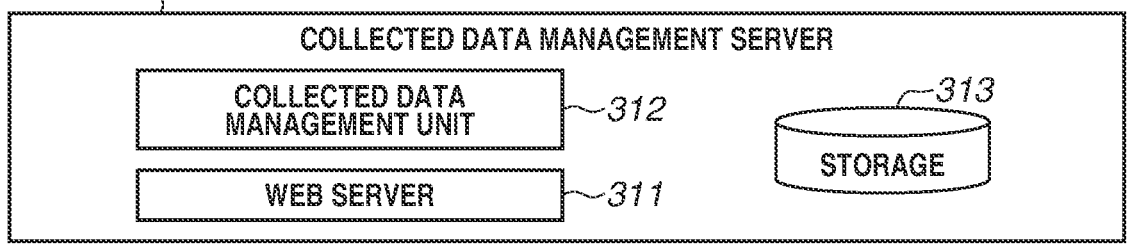

FIG. 3B is a software configuration diagram of the collected data management server 104. Each software module is stored in the ROM 223 or the storage device 226 illustrated in FIG. 2B, and loaded into the RAM 222 by the CPU 220 and executed by the CPU 220 or the GPU 221 as described above.

A web server 311 provides various interfaces of the collected data management server 104, and validates request information. A collected data management unit 312 manages collected data information 540 to be described with reference to FIG. 5B, and stores collected data accepted by the web server 311. A storage 313 stores information retained by the collected data management server 104.

<Software Configuration of Device Setting Management Server 105>

Figure 3C:
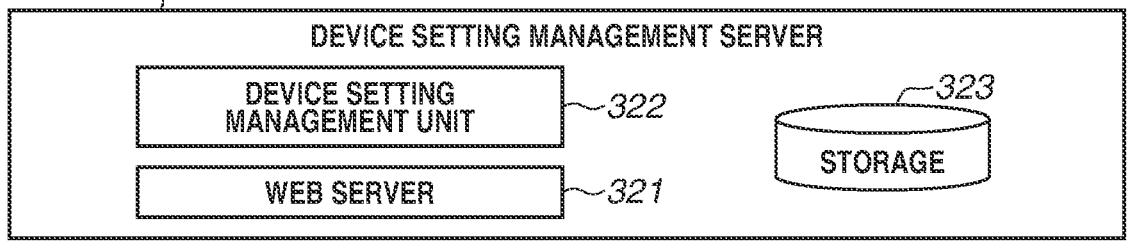

FIG. 3C is a software configuration diagram of the device setting management server 105. Each software module is stored in the ROM 223 or the storage 226 illustrated in FIG. 2B, and loaded into the RAM 222 by the CPU 220 and executed by the CPU 220 or the GPU 221 as described above.

A web serve 321 provides various interfaces of the device setting management server 105, and validates request information. A device setting management unit 322 manages vectorization information 600 and trained model information 610 to be described with reference to FIG. 6, and generates model information for estimating device settings through machine learning on collected data obtained from the collected data management server 104. The device setting management unit 322 also provides the MFP 102 with the vectorization information 600 and the trained model information 610. A storage 323 stores information retained by the device setting management server 105.

<Software Configuration of MFP 102>

Figure 3D:
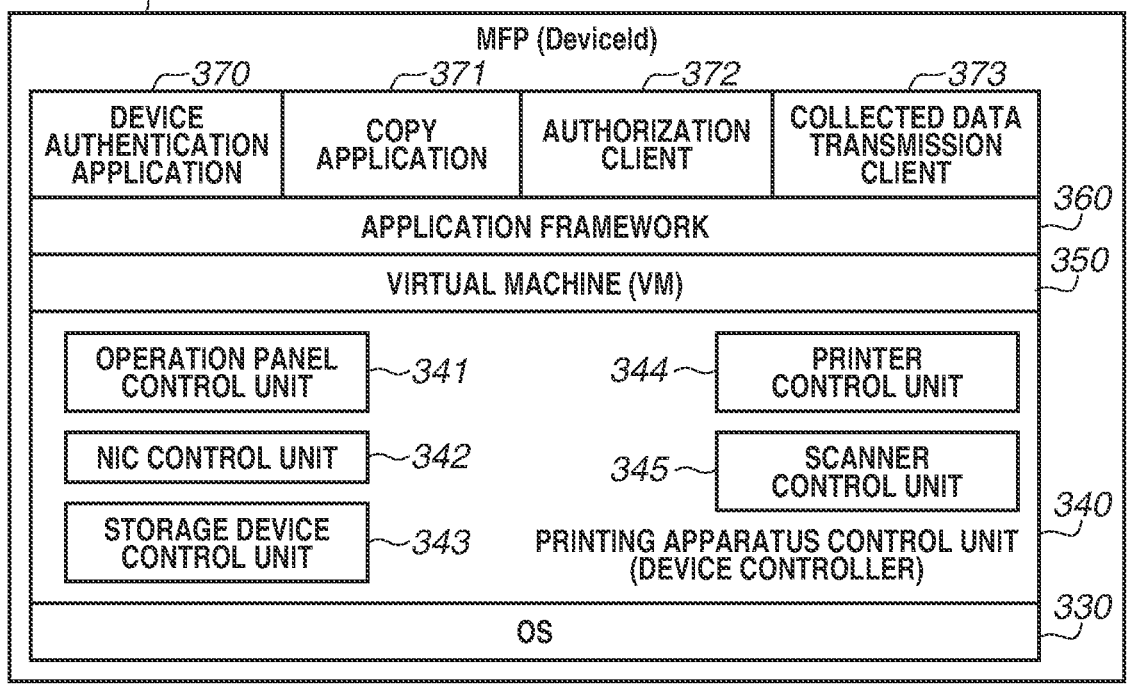

FIG. 3D is a software configuration diagram of the MFP 102. Each software module is stored in the ROM 203 or the storage device 208 illustrated in FIG. 2A, and loaded into the RAM 204 by the CPU 201 and executed by the CPU 201 or the GPU 202 as described above.

The MFP 102 is identified by a device identifier (ID). A unique ID is issued for each MFP 102 and set into the MFP 102 when the MFP 102 is manufactured. An OS 330 is typically a real-time OS. General-purpose OSes such as Linux (registered trademark) have sometimes been usable lately. A printing apparatus control unit (device controller) 340 controls various pieces of hardware of the MFP 102 illustrated in FIG. 2A. The printing apparatus control unit (device controller) 340 implements control between modules (341 to 345) that control the pieces of hardware. An operation panel control unit 341 controls a screen display on the operation panel 207.

A NIC control unit 342 controls a communication protocol such as the Transmission Control Protocol/Internet Protocol (TCP/IP) by using the NIC 205. A storage device control unit 343 is a disk controller that controls I/O to/from the storage device 208. A printer control unit 344 converts accepted print data (in a PDL or PDF language) into image data, and controls the printer 210 to print the image data on a sheet and discharge the sheet. A scanner control unit 345 accepts a scan instruction, and controls the scanner 211 to read a document and convert the read document into an image. A virtual machine (VM) 350 is a virtual application execution environment running as an application controlled by the OS. Among known examples is Java (registered trademark).

An application framework 360 has a function of managing lifecycles of applications to be managed running on the application execution environment provided by the VM 350. The application framework 360 also includes an I/F for controlling the lifecycles of the applications and an I/F publication function for mediating processing requests between the applications. A lifecycle indicates the states of an application, including installation, activation, deactivation, and uninstallation of the application.

The application framework 360 also provides the applications with I/Fs for controlling various pieces of hardware of the MFP 102 via the printing apparatus control unit 340. The applications running on the application framework 360 can receive print instructions, print results, and scan instructions, obtain scan images, and/or make a screen display on the operation panel 207 via the application framework 360.

A device authentication application 370, a copy application 371, an authorization client 372, and a collected data transmission client 373 are applications running on the application framework 360.

The device authentication application 370 is an application for managing login to the MFP 102, and provides the MFP 102 with a login function. The device authentication application 370 displays a login screen on the operation panel 207 of the MFP 102, accepts the user's login (user name and password), and performs user authentication. If authentication succeeds, the device authentication application 370 hides the login screen and makes various functions of the MFP 102 usable from the operation panel 207. An application usable without user authentication may be set in the device authentication application 370. The user can use the functions of the application without login.

The device authentication application 370 publishes an I/F for obtaining the user IDs of users logging in to the MFP 102 on the application framework 360. The applications on the application framework 360 can receive login events of the device authentication application 370 and obtain login information via the I/F.

The copy application 371 is an application for providing the MFP 102 with a copy function. The copy application 371 instructs the scanner 211 to read a document, and prints an image read by the scanner 211 on the printer 210. The copy application 371 also displays a copy setting input screen on the operation panel 207 and accepts copy settings from the user. The copy application 371 publishes an I/F for obtaining information about a copy job on the application framework 360. The applications on the application framework 360 can receive copy start and end events via the I/F.

The authorization client 372 is a client application of the authorization server 103. The authorization client 372 registers a tenant in the authorization server 103. The authorization client 372 registers a tenant in the authorization server 103 by the user inputting the tenant's one-time password issued by the authorization server 103 in advance into a screen of the authorization client 372. Accepting the tenant's one-time password from the user, the authorization client 372 obtains client information from the authorization server 103. As employed herein, a tenant refers to a group that is created in units of management of a plurality of users, such as a company and an organization, and identified by a tenant ID. The authorization client 372 obtains an authorization token from the authorization server 103, and provides the copy application 371 and the collected data transmission client 373 with the authorization token.

The collected data transmission client 373 detects events occurring in the MFP 102 and transmits event information to the collected data management server 104 in a format to be described below with reference to FIGS. 5A and 5B. The events for the collected data transmission client 373 to detect include activation, deactivation, and sleep events of the MFP 102, user login and logout events, and start and completion events of a copy job. The collected data transmission client 373 detects events occurring in the MFP 102 (the printing apparatus control unit 340, the device authentication application 370, and the copy application 371) via the application framework 360.

<Data in Authorization Server 103>

FIG. 4 illustrates data tables that the authorization server 103 stores in the storage 303. The data tables may be stored in another server configured to be capable of communication via the Internet 100 and/or the local network 101 instead of the storage 303 of the authorization server 103. The data tables retained by the authorization server 103 include client information 400 and authorization token information 410.

Information about clients that can access the collected data management server 104 and the device setting management server 105 is registered in the client information 400. A client ID 401 is an ID for uniquely identifying a client. A password 402 is intended to determine the authenticity of the client. The authorization server 103 identifies the client based on matching of the client ID 401 and the password 402. If the client is the MFP 102, an ID of the MFP 102 is registered in a device ID 403. A tenant ID 404 is an ID of the tenant (company or organization) using the client.

A record is registered in the authorization token information 410 when the authorization server 103 accepts an authorization token acquisition request. An authorization token 411 is a uniquely identifiable ID. A value indicating a certain time after the time of reception of the authorization token acquisition request is registered in an expiration date 412 of the authorization token. An authorization token 411 of which the expiration date 412 has elapsed is invalid. A scope 413 indicates an OAuth scope, or an accessible range of resources. A scope 413 is a scope where the authorization token 411 is usable and a scope delivered by the authorization token acquisition request to the authorization server 103 is registered.

In the present exemplary embodiment, PutDeviceData is used as a scope where collected data can be transmitted to the collected data management server 104. GetDeviceSetting is used as a scope where the vectorization information 600 and the trained model information 610 can be obtained from the device setting management server 105. A client ID of the client transmitting the authorization token acquisition request to the authorization server 103 is registered in a client ID 414.

<Data in Collected Data Management Server 104>

Figure 5A:
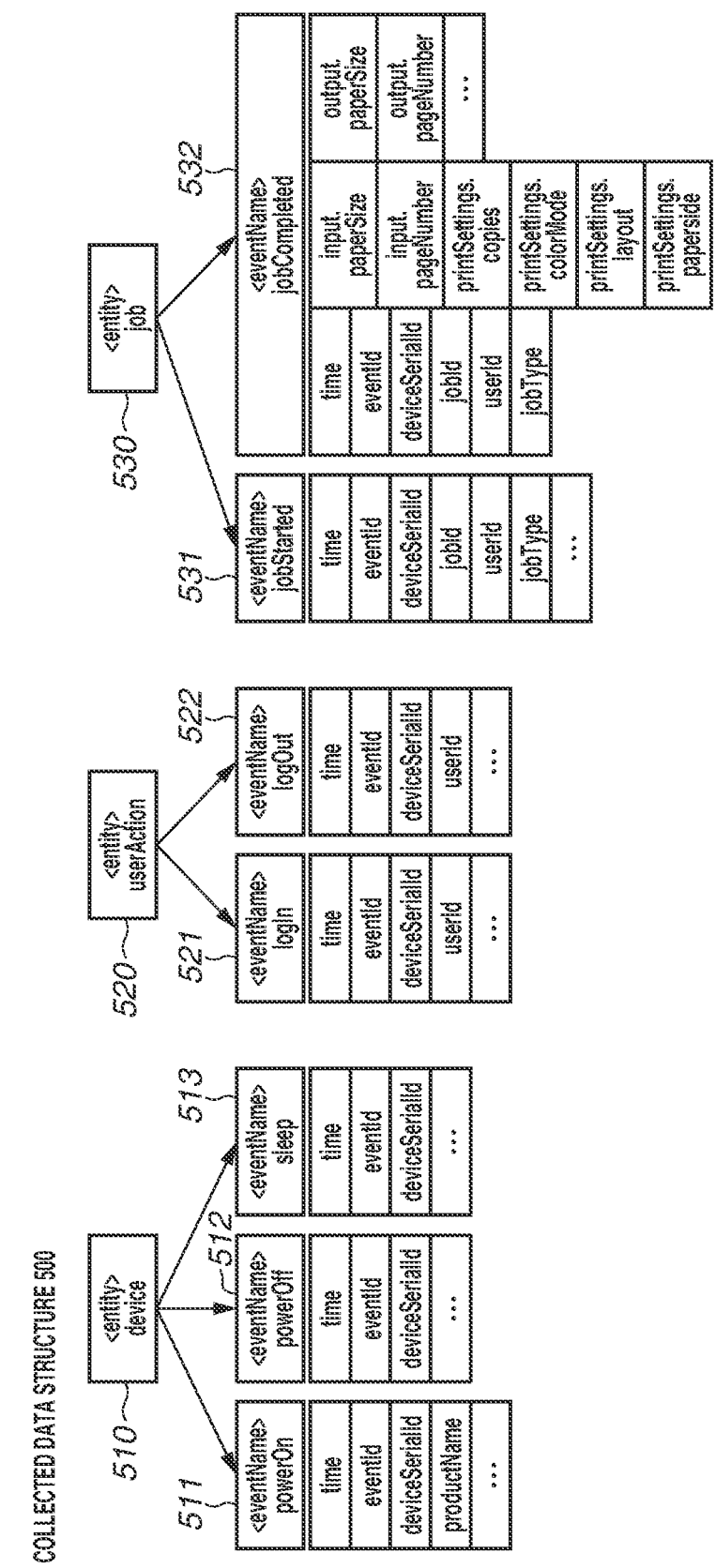

FIGS. 5A and 5B illustrate an example of a collected data structure 500 and collected data information 540 that the collected data management server 104 stores in the storage 313. Such data may be stored in a distributed manner in other servers configured to be capable of communication via the Internet 100 and/or the local network 101 instead of the storage 313 of the collected data management server 104.

The collected data structure 500 expresses a data structure of collected data that the collected data transmission client 373 generates and transmits and the collected data management server 104 receives and stores. The collected data structure 500 defines entities representing data classifications, and eventName's of events occurring in the entities. Examples of the entities include a device 510 related to the entire MFP 102, a userAction 520 related to user operations, and a job 530 related to jobs to be processed by the MFP 102. The device 510 includes events powerOn 511, powerOff 512, and sleep 513. Attributes are defined for each event.

Similarly, the userAction 520 includes events logIn 521 and logOut 522, and attributes are defined for each event. The job 530 includes events jobStarted 531 and jobCompleted 532, and attributes are defined for each event. An event attribute time indicates the time of occurrence of the event. eventId indicates an ID for uniquely identifying the event.

deviceSerialId indicates the ID of the MFP 102 where the event occurs. productName indicates the product name of the MFP 102 where the event occurs. userId indicates the ID of the user causing the event. jobId indicates the ID for uniquely identifying the job. jobType indicates the type of the job. The examples include copy, print, and scan. input.paperSize indicates the sheet size of a copy document. The examples include A3, A4, B5, and B4. input.pageNumber indicates the number of pages of the copy document to be read. printSettings.copies indicates the number of copies. printSettings.colorMode indicates color designation of the copy job. The examples include color and mono. printSettings.layout indicates page aggregation of the copy job. The examples include 1in1, 2in1, and 4in1. printSettings.paperside indicates a two-sided setting of the copy job. The examples include 1Sided and 2Sided. output.paperSize indicates an output sheet size of the copy job. The examples include A3, A4, B5, and B4. output.pageNumber indicates the number of pages of the copy job to be output.

The collected data information 540 is an example of collected data stored in the collected data management server 104. The collected data expresses an event in a JavaScript Object Notation (JSON) format. Keys in the JSON format of the collected data are information defined by the collected data structure 500. Values are the values of the occurred event. The collected data information 540 stores the collected data in a JSON Lines format where information about each single event is stored in a line. tenantId is added to the collected data transmitted from the collected data transmission client 373 when the collected data management server 104 stores the collected data information 540. tenantId indicates the tenant ID identified from the authorization token specified when the collected data is transmitted. The collected data structure 500 and the collected data information 540 described above are just examples and not limited to the foregoing data contents.

<Data in Device Setting Management Server 105>

FIG. 6 illustrates data tables that the device setting management server 105 stores in the storage 323. The data tables may be stored in another server configured to be capable of communication via the Internet 100 and/or the local network 101 instead of the storage 323 of the device setting management server 105. The data tables stored in the device setting management server 105 include vectorization information 600 and trained model information 610.

The vectorization information 600 is mapping information for converting event attributes having character string values among the event attributes of the collected data into vector representations to enable numerical calculation. If colorMode 601 has a value "color", the value is handled as 0. If colorMode 601 has a value "mono", the value is handled as 1. Vector representations are also defined for the values of layout 602, paperside 603, and paperSize 604. The vectorization uses one-hot notation where only one value is 1 and the other values are 0. Vector representations are uniquely assigned attribute by attribute.

The trained model information 610 manages files of model information obtained as a result of machine learning on the collected data. Models in the machine learning will be described below. The file paths of model files for each tenant ID 611 and each user ID 612 are stored in a trained model file path 613. An asterisk (*) represents all. The asterisk (*) in the tenant ID 611 indicates that the file paths are common to all the tenants. The asterisk (*) in the user ID 612 indicates that the file paths are common to all the users. A plurality of file paths of model files for respective event attributes are registered in the trained model file path 613. Trained model files (model files) with asterisks (*) in both IDs are ones common to all the users using the MFP 102. In such a manner, trained model files are associated with users and tenants. Note that user-specific trained model files do not need to be associated with tenants.

The trained model files retained by the device setting management server 105 are stored in the storage 323, and the file paths of the storage 323 are registered in the trained model file path 613. The trained model files may be stored in another server configured to be capable of communication via the Internet 100 and/or the local network 101 instead of the storage 323 of the device setting management server 105. In such a case, Universal Resource Locators (URLs) where the trained model files are stored are registered in the trained model file path 613. As illustrated in the trained model file path 613, trained models used for device estimation include a plurality of trained models prepared for respective setting items.

<Data in MFP 102>

FIG. 7 illustrates data tables that the authorization client 372 and the copy application 371 store in the storage device 208. Client information 700 is a data table retained by the authorization client 372. The authorization client 372 stores client information 700 registered in the authorization server 103. The items of the client information 700 are similar to those of the client information 400 retained in the authorization server 103.

Trained model information 710 is a data table retained by the copy application 371. The copy application 371 stores trained model information obtained from the device setting management server 105. The items of the trained model information 710 are similar to those of the trained model information 610 in the device setting management server 105. The copy application 371 retains only the trained model information associated with the tenant ID of the tenant using the MFP 102 and the trained model information common to all the tenants. The copy application 371 also retains the vectorization information 600 obtained from the device setting management server 105. The vectorization information 600 is omitted in FIG. 7 since the vectorization information 600 includes the same contents.

<Data Collection, Training, and Estimation Procedures>

FIG. 8 illustrates an outline of procedures for performing machine learning on the collected data from the MFP 102 and estimating copy settings based on the trained model information. Details of each procedure will be described below. In step S8.1.1, the collected data transmission client 373 receives an event notification of an event occurring in the MFP 102 from the application framework 360. In step S8.1.2, the collected data transmission client 373 converts the event information received in step S8.1.1 into a JSON format based on the collected data structure 500 and transmits the resulting collected data to the collected data management server 104.

In step S8.1.3, the collected data management server 104 stores the collected data transmitted from the collected data transmission client 373 as the collected data information 540. In step S8.2.1, the device setting management server 105 obtains the collected data information 540 from the collected data management server 104. In step S8.2.2, the device setting management server 105 performs machine learning using the collected data information 540 obtained in step S8.2.1, and stores the generated trained model in the storage location specified by the trained model file path 613.

In step S8.3.1, the copy application 371 obtains the vectorization information 600, the trained model information 610, and the trained model files (files stored in the storage location specified by the trained model file path 613) from the device setting management server 105, and stores the vectorization information 600, the trained model information 610, and the trained model files. In step S8.4.1, if a copy document is placed on the scanner 211, the copy application 371 receives an event notification from the application framework 360. The event notification includes the sheet size and the number of pages of the copy document.

In step S8.4.2, the copy application 371 estimates copy settings by using the trained model files obtained in step S8.3.1 based on the sheet size and the number of pages of the copy document, included in the event notification received in step S8.4.1. Steps S8.1.1 to S8.1.3, steps S8.2.1 and S8.2.2, step S8.3.1, and steps S8.4.1 and S8.4.2 are performed asynchronously from each other. The processing of steps S8.2.1 and S8.2.2 and step S8.3.1 is performed on a regular basis.

<Data Collection Procedure>

FIG. 9 illustrates details of the data collection procedure in steps S8.1.1. to S8.1.3 of FIG. 8. In step S9.1, the collected data transmission client 373 receives an event notification of an event occurring in the MFP 102 from the application framework 360. The event notification includes an entity, eventName, and event attribute (attribute). In step S9.2, the collected data transmission client 373 generates collected data in a JSON format based on the event notification received in step S9.1. The data structure of the collected data is the same as that described above with reference to FIGS. 5A and 5B.

In step S9.3, the collected data transmission client 373 issues an authorization token acquisition request to the authorization client 372. PutDeviceData is specified as the scope of the authorization token acquisition request. Receiving the authorization token acquisition request, the authorization client 372 issues an authorization token acquisition request including the client ID 701, the password 702, and a scope specifying PutDeviceData to the authorization server 103, and obtains an authorization token. The authorization client 372 passes the obtained authorization token to the collected data transmission client 373.

In step S9.4, the collected data transmission client 373 transmits the collected data generated in step S9.2 and the authorization token obtained in step S9.3 to the collected data management server 104. In step S9.5, the collected data management server 104 receives the collected data and the authorization token transmitted from the collected data transmission client 373.

In step S9.6 (authorization token check), the collected data management server 104 issues an authorization token verification request including the authorization token received in step S9.5 and a scope specifying PutDeviceData to the authorization server 103. Accepting the authorization token verification request, the authorization server 103 verifies matching of the authorization token 411 and the scope 413 and verifies the expiration date 412 based on the authorization token information 410. If the verification succeeds, the authorization server 103 passes the tenant ID 404 of the client information 400 related to the client ID 414 to the collected data management server 104.

In step S9.7, the collected data management server 104 adds the tenant ID received from the authorization server 103 in the authorization token check in step S9.6 to the collected data received in step S9.1. In step S9.8., the collected data management server 104 stores the collected data to which the tenant ID is added in step S9.7 as the collected data information 540.

<Training Procedure>

Figure 10:
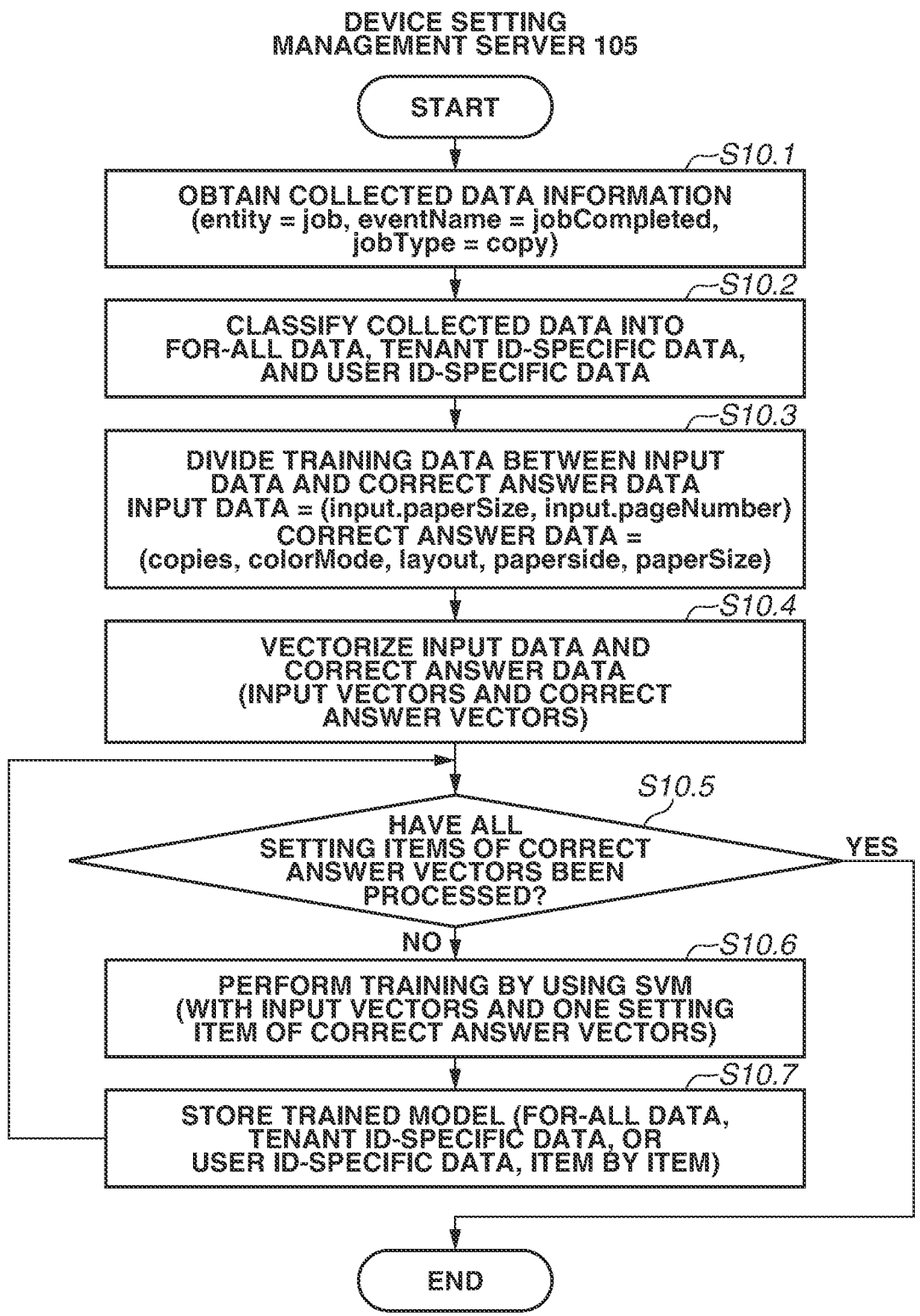
FIG. 10 illustrates the training procedure.

FIG. 10 illustrates details of the training procedure in steps S8.2.1 and S8.2.2 of FIG. 8. Training timing is not limited in particular, and the training is started at any timing. In step S10.1, the device setting management server 105 obtains the collected data information 540 from the collected data management server 104. Of the obtained pieces of collected data information 540, the device setting management server 105 uses only those where entity=job 530, eventName=jobCompleted 532, and jobType=copy.

In step S10.2, the device setting management server 105 classifies the pieces of collected data prepared in step S10.1 into for-all data, tenant ID-specific data, and user ID-specific data, which are each handled as training data. The processing of step S10.2 and the subsequent steps is performed on all the training data including the classified for-all training data, tenant ID-specific training data, and user ID-specific training data.

In step S10.3, the device setting management server 105 divides the training data prepared in step S10.2 between input data and correct answer data. The input data includes the values of input.paperSize and input.pageNumber. The correct answer data includes the values of paperSettings.copies, paperSettings.colorMode, paperSettings.layout, paperSettings.paperside, and paperSettings.paperSize ("paperSettings" will be omitted in the drawings as well as in the following description).

Scanned images themselves can also be used as the input data in addition to the attribute values of the scan images. The values of time information (time at which a copy operation is executed), user attributes (department, post, and age), and attributes of the MFP 102 (model, installation location, and copy speed) can also be used as the input data in addition to the attribute values. Such values can be learned through numerical vectorization. In other words, the input data according to the first exemplary embodiment is not limited to that related to image processing. The correct answer data may also include setting items other than the copy setting items described in the present exemplary embodiment. Any setting items can be applied as long as setting items about the functions of the MFP 102 are used as correct answer data.

In step S10.4, the device setting management server 105 vectorizes the input data and the correct answer data generated in step S10.3 into input vectors and correct answer vectors, respectively, based on the mapping of the vectorization information 600. In step S10.5, the device setting management server 105 determines whether all the setting items (copies, colorMode, layout, paperside, and paperSize) of the correct answer vectors generated in step S10.4 have been processed. In steps S10.5 to S10.7, trained models for the respective setting items of the MFP 102 are generated.

In the present exemplary embodiment, the correct answer vectors are processed in units of each setting item. However, a model may be trained by using a plurality of setting items at a time. If a model is trained by using a plurality of setting items of the correct answer vectors, a large amount of data may be desirable for accurate estimation since the vector space is extended. For example, a large amount of tenant-specific or user-specific training data is difficult to collect. Training with a small amount of training data in a wide vector space can result in poor estimation accuracy. In the present exemplary embodiment, the correct answer vectors are processed in units of each setting item. This can increase the estimation accuracy even with a small amount of training data since the training is performed in a minimum vector space.

In step S10.6, the device setting management server 105 performs training by using a support vector machine (SVM) by using the input vectors and one setting item of the correct answer vectors generated in step S10.4. The SVM is a conventional machine learning algorithm. In the present exemplary embodiment, A radial basis function (RBF) kernel nonlinear soft-margin SVM is used. During training, the trailing result is evaluated by cross-validation where the training data is divided between analysis data and validation data at random. Hyperparameters of an RBF-based SVM include a cost parameter (C) and a gamma ($\gamma$), which affect the estimation performance. A result having high estimation performance is selected as the training result by a grid search where a plurality of values of the hyperparameters are exhaustively tried.

The SVM can be trained for both classification and regression. To estimate a numerical value such as copies, regression is used. For colorMode, layout, paperside, and paperSize, r classification is used. There are various machine learning algorithms, including the perceptron, logistic regression, the k-nearest neighbor algorithm, the naive Bayesian method, neural networks, convolutional neural networks, decision trees, random forests, linear regression, polynomial regression, least absolute shrinkage and selection operator (LASSO) regression, and ridge regression. There are also various types of SVMs, including a hard margin SVM and a polynomial kernel SVM.

Hyperparameters of the machine learning algorithms also vary from one machine learning algorithm to another. Techniques for evaluating the training result include the resubstitution estimate and the test sample method aside from cross-validation. Techniques for optimizing the hyperparameters of the machine learning algorithms include a random search, Latin hypercube sampling, and Bayesian optimization aside from a grid search. In the present exemplary embodiment, the training techniques including the machine learning algorithm, the method for evaluating the training result, and the technique for optimizing the hyperparameters of the machine learning algorithm may be changed.

In step S10.7, the device setting management server 105 stores the trained model trained in step S10.6 in a file and registers the file path of the file in the trained model information 610. The file storing the trained model (trained model file) includes the type of learning algorithm (RBF-based nonlinear soft-margin SVM), the values of the hyperparameters of the learning algorithm (cost parameter (C) and gamma ($\gamma$)), and a coefficient vector obtained as the training result.

In the case of the tenant ID-specific training data classified in step S10.2, the file path is registered in the trained model information 610 with the tenant ID of the training data specified as the tenant ID 611 and an asterisk (*) as the user ID 612. In the case of the user ID-specific training data classified in step S10.2, the file path is registered with the tenant ID of the training data specified as the tenant ID 611 and the user ID of the training data as the user ID 612. In the case of the for-all training data classified in step S10.2, the file path is registered with asterisks (*) as the tenant ID 611 and the user ID 612. The setting item name (copies, color-Mode, layout, paperside, or paperSize) processed in step S10.5 is used for the filename of the trained model file.

<Data Flow>

Figure 11:
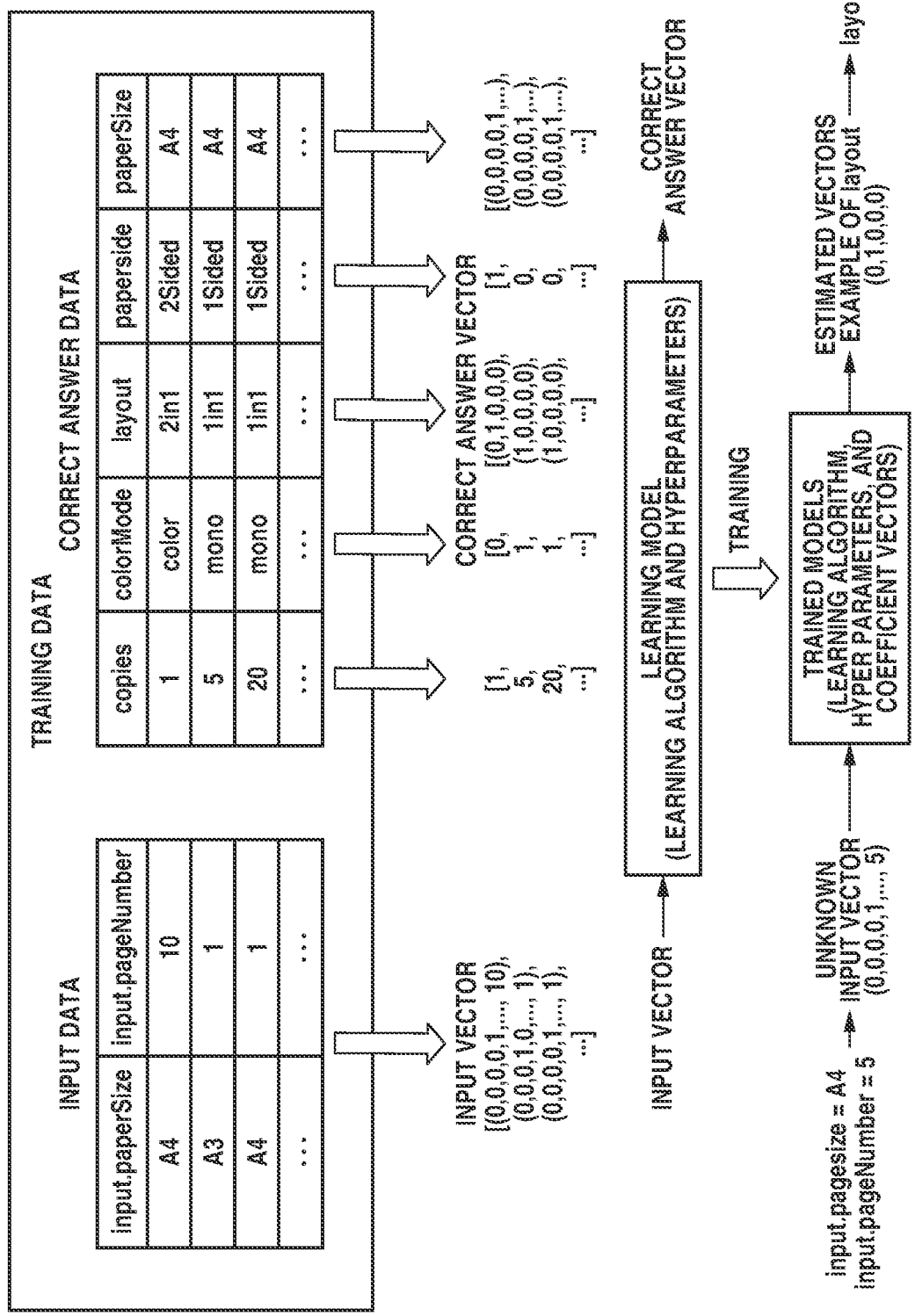
FIG. 11 illustrates an example of a data flow in the training procedure.

FIG. 11 illustrates an example of a data flow in the training procedure described in FIG. 10. The training data classified into for-all data, tenant ID-specific data, and user ID-specific data is initially divided between input data and correct answer data. The input data and the correct answer data are then vectorized into input vectors and correct answer vectors based on the vectorization information 600. In machine learning, hyperparameters and coefficient vectors that are optimum when the input vectors are input to and the correct answer vectors are output from the trained models are searched for. The output obtained by inputting an unknown input vector into the trained model that is the training result is an estimated vector, whereby an estimated value can be obtained based on the vectorization information 600.

<Procedure for Obtaining Vectorization Information, Trained Model Information, and Trained Model Files>

Figure 12:
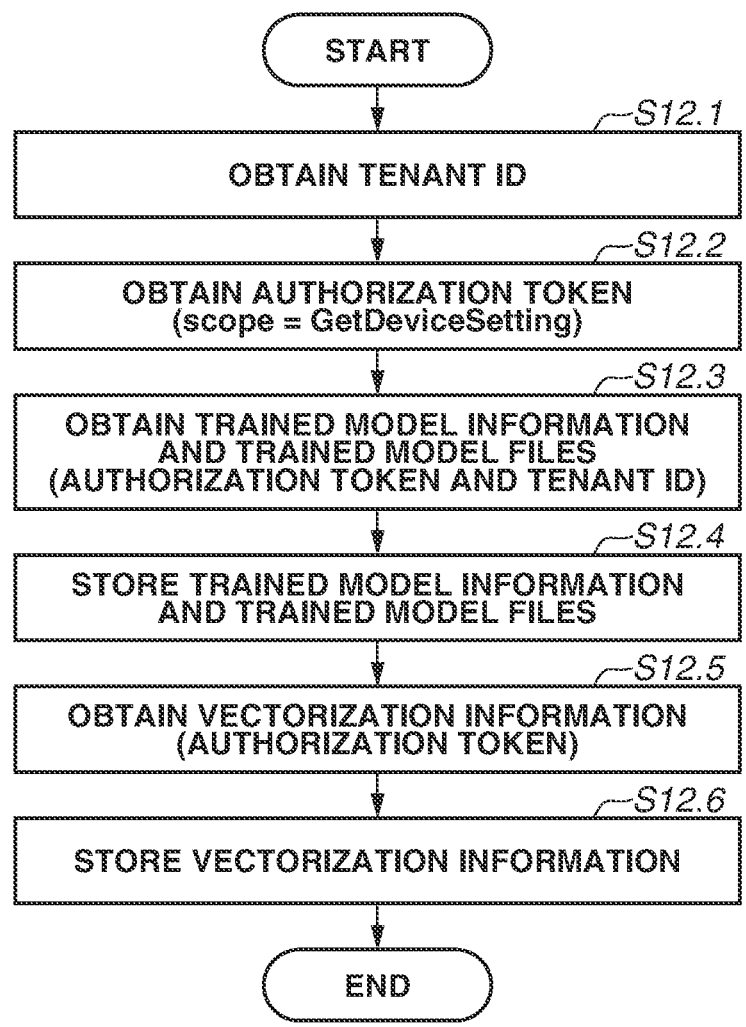
FIG. 12 illustrates details of a procedure for obtaining vectorization information, trained model information, and trained model files.

FIG. 12 illustrates details of the procedure for obtaining the vectorization information, the trained model information, and the trained model files by the copy application 371 in step S8.3.1 of FIG. 8. The copy application 371 obtains the vectorization information, the trained model information, and the trained model files on a regular basis.

In step S12.1, the copy application 371 obtains the tenant ID from the authorization client 372. The authorization client 372 passes the tenant ID 704 of the client information 700 to the copy application 371. In step S12.2, the copy application 371 issues an authorization token acquisition request to the authorization client 372 with GetDeviceSetting specified as the scope, and receives an authorization token. Since the authorization token acquisition request is described above in step S9.3, a description thereof will be omitted.

In step S12.3, the copy application 371 obtains the trained model information and the trained model files from the device setting management server 105. Here, the copy application 371 specifies trained models by specifying the authorization token received in step S12.2 and the tenant ID obtained in step S12.1. The device setting management server 105 requests the authorization server 103 to check the received authorization token, and passes the trained model information 610 and the trained model files matching the specified tenant ID to the copy application 371.

In step S12.4, the copy application 371 stores the trained model files and the trained model information 610 obtained in step S12.2. In step S12.5, the copy application 371 obtains the vectorization information 600 received from the device setting management server 105 by using the authorization token received in step S12.2 as a parameter. The device setting management server 105 requests the authorization server 103 to check the received authorization token, and passes the vectorization information 600 to the copy application 371. In step S12.6, the copy application 371 stores the vectorization information 600 obtained in step S12.5.

<Estimation Procedure>

Figure 13:
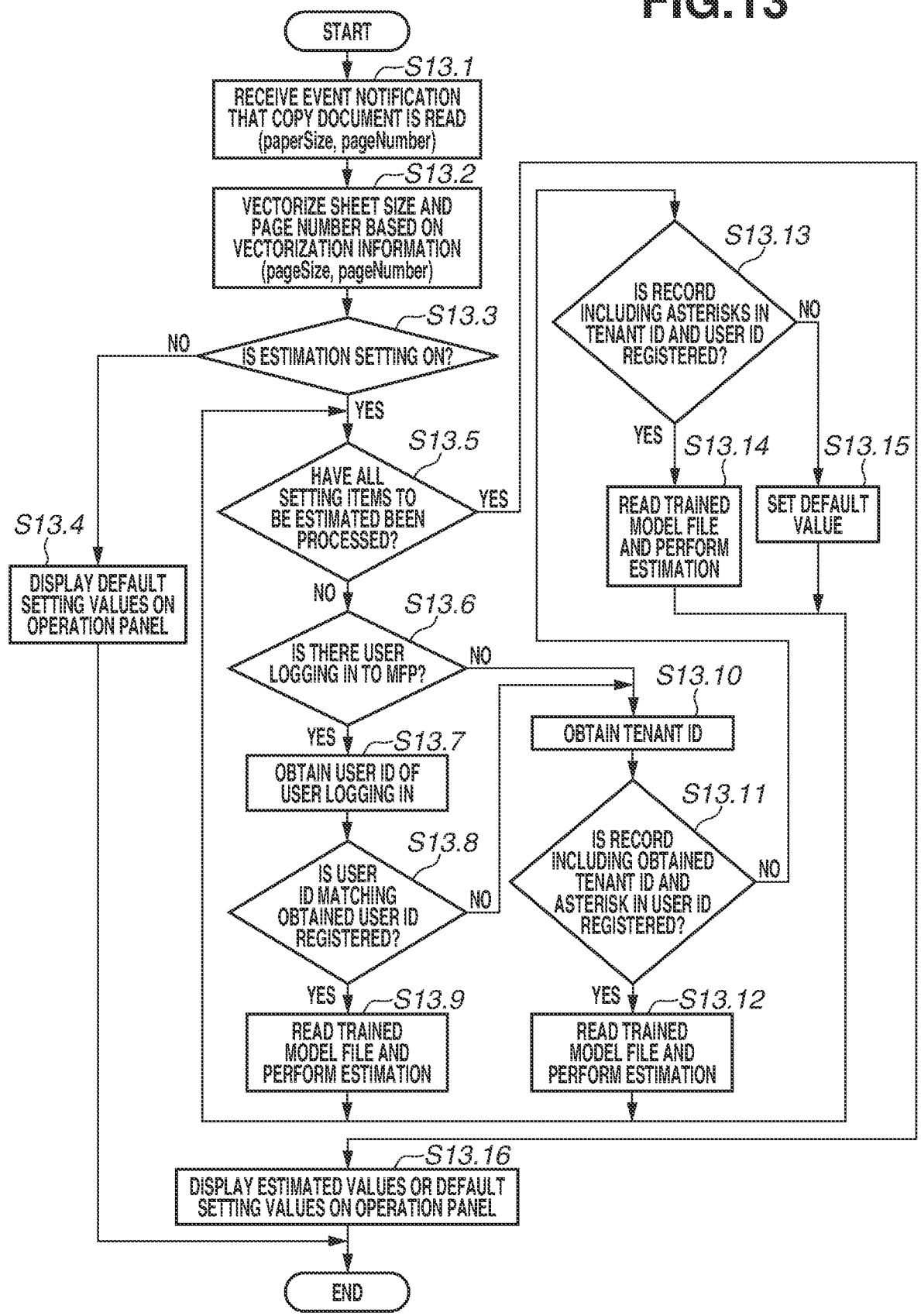
FIG. 13 illustrates the estimation procedure.

FIG. 13 illustrated details of the estimation procedure by the copy application 371 in steps S8.4.1 and S8.4.2 of FIG. 8. In step S13.1, the copy application 371 receives an event notification that a copy document is read, from the application framework 360. The event notification includes the sheet size (paperSize) and the number of pages (pageNumber) of the copy document.

In step S13.2, the copy application 371 vectorizes the sheet size (paperSize) and the number of pages (pageNumber) received in step S13.1 based on the vectorization information 600 obtained and stored in step S12.4. In step S13.3, the copy application 371 checks whether an estimation setting is on or off. The estimation setting can be switched on/off by the user, and stored in the storage device 208 by the copy application 371.

In step S13.3, if the estimation setting is off (NO in step S13.3), the processing proceeds to step S13.4. In step S13.4, the copy application 371 displays default setting values on the operation panel 207. The default setting values may be retained by the copy application 371. Alternatively, for example, the printing apparatus control unit 340 may include a user management unit, and may display default values of the copy application 371 prepared for each login user. In any case, some default values are used if the estimation setting is off (there is a setting to not use trained model-based estimation). The default values may be in any form.

In step S13.3, if the estimation setting is on (YES in step S13.3) the processing proceeds to step S13.5. In step S13.5, the copy application 371 determines whether all the setting items to be estimated (copies, colorMode, layout paperside, paperSize) have been processed. If all the setting items to be estimated have been processed (YES in step S13.5), the processing proceeds to step S13. 16. If all the setting items to be estimated have not been processed (NO in step S13.5), the processing proceeds to step S13.6. In step S13.6, the copy application 371 inquires of the device authentication application 370 whether there is a user logging in to the MFP 102. In step S13.6, if there is a user logging in (YES in step S13.6), the processing proceeds to step S13.7. In step S13.7, the copy application 371 obtains the user ID of the user logging in from the device authentication application 370.

In step S13.8, the copy application 371 checks whether a user ID 712 matching the user ID obtained in step S13.7 is registered in the trained model information 710. In step S13.8, if there is a user ID-specific trained model corresponding to the user ID obtained in step S13.7 (YES in step S13.8), the processing proceeds to step S13.9. In step S13.9, the copy application 371 reads a trained model file stored in the storage location indicated by the trained model file path 713 of the record, and performs estimation. Here, the sheet size (paperSize) and the number of pages (pageNumber) vectorized in step S13.2 are input to the trained model, and an estimated vector is output. If the setting item to be estimated is a numerical value (copies), the value of the estimated vector is rounded off into an integer estimated value. If the setting item to be estimated is a classification, the obtained estimation vector is converted into an estimated value by using the vectorization information 600.

If, in step S13.6, there is no user logging in to the MFP 102 (NO in step S13.6) or if, in step S13.8, there is no user ID-specific trained model corresponding to the user ID obtained in step S13.7 (NO in step S13.8), the processing proceeds to step S13.10. In step S13.10, the copy application 371 obtains the tenant ID from the authorization client 372. The authorization client 372 passes the tenant ID 704 of the client information 700 to the copy application 371.

In step S13.11, the copy application 371 checks whether a record including the tenant ID obtained in step S13.10 and an asterisk (*) in the user ID 712 is registered in the trained model information 710. In step S13.11, if there is a tenant ID-specific trained model corresponding to the tenant ID obtained in step S13.10 (YES in step S13.11), the processing proceeds to step S13.12. In step S13.12, the copy application 371 reads a trained model file stored in the storage location indicated by the trained model file path 713 of the record, and performs estimation. The input and output of the trained model and the conversion of the value of the estimated vector into an estimated value are the same as described in step S13.9.

In step S13.11, if there is no tenant ID-specific trained model corresponding to the tenant ID obtained in step S13.10 (NO in step S13.11), the processing proceeds to step S13.13. In step S13.13, the copy application 371 checks whether a record including asterisks (*) in the tenant ID 711 and the user ID 712 is registered in the trained model information 710. If such a record is registered (YES in step S13.13), the processing proceeds to step S13.14. In step S13.14, the copy application 371 uses a trained model in the record including asterisks (*) in the tenant ID 711 and the user ID 712 in the trained model information 710. The copy application 371 reads a trained model file stored in the storage location indicated by the trained model file path 713, and performs estimation. The input and output of the trained model and the conversion of the value of the estimated vector into an estimation value are the same as described in step S13.9.

If no such trained models are registered in steps S13.8, S13.11, and S13.13 (NO in steps S13.8, S13.11, and S13.13), the processing proceeds to step S13.15. In step S13.15, the copy application 371 sets a default value. There are several possible reasons why no such trained models are registered, including that the MFP 102 is being unable to cooperate with the device setting management server 105 and that the device setting management server 105 imposes a restriction on the use of the estimation function by the MFP 102. In such cases, the trained models are not available. The default setting values are as described in step S13.4. In step S13.5, if all the setting items have been estimated (YES in step S13.5), the processing proceeds to step S13.16. In step S13.16, the copy application 371 displays the estimated values of the respective setting items estimated in step S13.9, S13.12, or S13.14, or the default setting values set in step S13.15 on the operation panel 207.

Which trained model to use to estimate the copy setting, the user ID-specific trained model, the tenant ID-specific trained model, or the trained model in the record where the tenant ID 711 and the user ID 712 are asterisks (*), may be switched based on a setting. Whether to estimate the copy setting by using the trained model or use the default setting value may also be switched based on a setting.

As described above, the copy settings can be estimated from the sheet size and the number of pages of a copy document by storing events occurring in the MFP 102 as collected data in a server, and using the result of training on the collected data as trained models in the MFP 102. The collected data increases and the estimation accuracy improves as users use the MFP 102. The users can thus eventually perform copy operations with desired copy settings by simply feeding a copy document without a special operation.

Since the collected data is classified into tenant-specific data and user-specific data and learned separately, estimation tailored to the tenants and users can be performed with improved convenience. Since the user-specific trained models, the tenant-specific trained models, and the for-all trained models are used in order, estimation can be applied to even users who use the MFP 102 without logging in and users and tenants who use the MFP 102 for the first time.

In FIG. 13, the highest priority is given to the user-specific trained models, the second highest priority to the tenant-specific trained models, and the third highest priority to the for-all trained models. However, this is not restrictive. The tenant ID may be first identified to use the tenant-specific trained models. The for-all trained models may be used first. In other words, the trained models do not need to be used in the order illustrated in the flowchart of FIG. 13.

[Other Exemplary Embodiments]

In the first exemplary embodiment, the services are described to be provided as cloud services since such a mode is suitable. However, for example, the MFP 102 may provide the training and estimation services by itself. Specifically, the MFP 102 may provide the functions of the collected data management server 104 and the device setting management server 105. Such a configuration is not suitable compared to cloud services, but the present exemplary embodiment can be practiced without a problem. The destination to provide the services is not limited in particular, not even the MFP 102 itself.

The first exemplary embodiment has been described by using the copy application 371 as an example. However, the present exemplary embodiment can also be applied to applications other than a copy application. For example, in a configuration where document data or a document is electrically or optically read to generate image data, training and estimation can be performed and the present exemplary embodiment can be applied if there are attribute values of the image data and setting values set in performing image processing on the document data or document. While the first exemplary embodiment has been described by using the MFP 102 as an example, other devices may be used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-007008, filed Jan. 18, 2019, which is hereby incorporated by reference herein in its entirety.

What is claimed is:

1. A system comprising:
a server; and
a multi-function printer (MFP) configured to communicate with the server via an internet,
wherein the server includes:
   first one or more non-transitory computer-readable storage media storing first one or more programs; and
   first one or more processors communicatively connected to the first one or more non-transitory computer-readable storage media and configured at least by the first one or more programs to cause the server to:
      train a machine learning model associated with a tenant to which the MFP belongs, wherein the trained machine learning model associated with the tenant to which the MFP belongs is generated by training the machine learning model using training data that includes (i) input data representing document data about documents read from a plurality of MFPs that belong to the tenant to which the MFP belongs and (ii) teaching data representing collected setting data about each of the documents read from the plurality of MFPs that belong to the tenant to which the MFP belongs, and
wherein the MFP includes:
   second one or more non-transitory computer-readable storage media storing second one or more programs; and
   second one or more processors communicatively connected to the second one or more non-transitory computer-readable storage media and configured at least by the second one or more programs to cause the MFP to:
      obtain, from the server, the trained machine learning model associated with the tenant to which the MFP belongs;
      input data generated based on particular document data obtained by the MFP into the trained machine learning model, which outputs estimation data; and
      set a setting of the MFP based on the estimation data.

2. The system according to claim 1, wherein the second one or more processors are further configured to cause the MFP to, if instructed not to use the trained machine learning model, set a default copy setting retained by the MFP or a copy setting instructed to be recorded by a user.

3. The system according to claim 1,
wherein the trained machine learning model is available for all users using the MFP in common, and
wherein the second one or more processors are further configured to cause the MFP to, if a specific trained machine learning model is absent, make a copy setting based on the trained machine learning model.

4. The system according to claim 1,
wherein the server includes trained machine learning models generated user by user, and
wherein the second one or more processors are further configured to cause the MFP to, if the MFP has a login function, a user logging in to the MFP is identified, and there is a trained machine learning model associated with the user logging in, make a copy setting based on an estimation result based on the trained machine learning model associated with the user logging in.

5. The system according to claim 1,
wherein the server includes trained machine learning models generated tenant by tenant, and
wherein the second one or more processors are further configured to cause the MFP to, if a tenant is identified from an issued authorization token and there is a trained machine learning model associated with the identified tenant, make a copy setting based on an estimation result based on the trained machine learning model associated with the identified tenant.

6. The system according to claim 1,
wherein the document data includes sheet size information about the document, page number information, and scan data generated by reading the document, and
wherein the setting data includes color setting information, page aggregation setting information, two-sided setting information, and output sheet size setting information.

7. A method for controlling a system including a server and a multi-function printer (MFP), the method comprising:
training a machine learning model associated with a tenant to which the MFP belongs, wherein the trained machine learning model associated with the tenant to which the MFP belongs is generated by training the machine learning model using training data that includes (i) input data representing document data about documents read from a plurality of MFPs that belong to the tenant to which the MFP belongs and (ii) teaching data representing collected setting data about each of the documents read from the plurality of MFPs that belong to the tenant to which the MFP belongs;
obtaining the trained machine learning model associated with the tenant to which the MFP belongs;
inputting data generated based on particular document data obtained by the MFP into the trained machine learning model, which outputs estimation data; and
setting a setting of the MFP based on the estimation data.

* * * * *